United States Patent [19]

McMahon et al.

[11] Patent Number: 5,789,732
[45] Date of Patent: Aug. 4, 1998

[54] PORTABLE DATA MODULE AND SYSTEM FOR CONSUMER TRANSACTIONS

[76] Inventors: Steven A. McMahon, 2351 E. Irwin, Eugene, Oreg. 97402; Alexander M. McQueen, 3393 S. Lambert St.; Matt D. Schler, 4121 Castelloe Rd., both of Eugene, Oreg. 97405

[21] Appl. No.: 663,025

[22] Filed: Jun. 7, 1996

Related U.S. Application Data

[60] Provisional application No. 60/000,051 and provisional application No. 60/000,063 Jun. 8, 1995.

[51] Int. Cl.$^6$ .............................. G06K 05/00; G06K 19/00
[52] U.S. Cl. .................................................. 235/487; 235/380
[58] Field of Search ............................. 235/380, 382, 235/487, 282.5, 383

[56] References Cited

U.S. PATENT DOCUMENTS

| | | | |
|---|---|---|---|
| 4,614,861 | 9/1986 | Pavlov et al. | 235/380 |
| 4,667,087 | 5/1987 | Quintana | 235/380 |
| 4,697,072 | 9/1987 | Kawana | 235/380 |
| 4,800,255 | 1/1989 | Imran | 235/382 |
| 4,812,634 | 3/1989 | Ohta et al. | 235/492 |
| 4,868,376 | 9/1989 | Lessin et al. | 235/492 |
| 4,973,828 | 11/1990 | Naruse et al. | 235/380 |
| 5,146,499 | 9/1992 | Geffrotin | 380/23 |
| 5,153,842 | 10/1992 | Dlugos, Sr. et al. | 364/478 |
| 5,180,902 | 1/1993 | Schick et al. | 235/380 |
| 5,192,947 | 3/1993 | Neustein | 340/825.44 |
| 5,450,491 | 9/1995 | McNair | 380/25 |
| 5,594,493 | 1/1997 | Nemirofsky | 348/13 |
| 5,627,355 | 5/1997 | Rahman et al. | 235/380 |

*Primary Examiner*—Donald T. Hajec
*Assistant Examiner*—Douglas X. Rodriguez
*Attorney, Agent, or Firm*—Lyon & Lyon LLP

[57] ABSTRACT

A Consumer Data Device of a plastic encased, credit-card sized case containing a memory for data and transaction retention, an LCD display for displaying information, an LCD display for bar-codes to be read by a bar-code scanner, a controller to scroll through stored information, and a data communication link via spread-spectrum RF or direct electrical contact to a host computer.

20 Claims, 8 Drawing Sheets

APPARATUS FOR INITIATING RAINCHECK PRINTING PROCESS

FIG. 7
142 FRONT LINEAR POLARIZER
144 LIQUID CRYSTAL CELL
146 REAR LINEAR POLARIZER
148 REFLECTOR
140

FIG. 8
144 LIQUID CRYSTAL CELL
146 REAR LINEAR POLARIZER
148 REFLECTOR
150

PORTABLE DATA MODULE AND SYSTEM FOR CONSUMER TRANSACTIONS

CONTINUING APPLICATION DATA

This application is a continuing application of provisional applications Ser. No. 60/000,051 and Ser. No. 60/000,063 each filed Jun. 8, 1996 and incorporated by reference.

BACKGROUND

The field of the present invention relates to the use of a Consumer Data Device (CDD) for use in various transactions and information transferral.

Previously, consumer data devices have been typically limited to "front end" use, that is, use at the point-of-sale (POS). In many cases, the most effective use of these devices from a merchandiser's perspective would be well before the POS transaction, such as in interaction with systems to generate coupons or "rainchecks". Two-way communications with these devices have been limited to direct contact means, either by electrical conductors or magnetic stripes, both of which tend to wear out because of the required mechanical contact forces. One-way communications using liquid crystal displays being read by POS system bar-code scanners have suffered from poor performance due to lack of adequate display contrast.

SUMMARY OF THE INVENTION

The present invention is directed to a Consumer Data Device comprised of a plastic encased, credit-card sized case containing a memory for data and transaction retention, an LCD display for displaying information, an LCD display for bar-codes to be read by a bar-code scanner, and means to scroll through the stored information, and a data communication link via spread-spectrum RF or direct electrical contact.

DETAILED DESCRIPTION OF PREFERRED EMBODIMENTS

Preferred embodiments will now be described with reference to the drawings.

In its simplest form, the CDD may be considered a portable data storage and retrieval device that consumers can use to replace "paper" transactions and exchanges of information. The CDD enables numerous methods and concepts to replace coupons, rainchecks, product information, recipes, as well as to acquire consumer information. An important enabler for the effectiveness of the CDD is the ability of the device to communicate and respond to the POS (Point-of-Sale) system and/or main store computer system. Methods of these communications are also discussed below.

Figure 1:
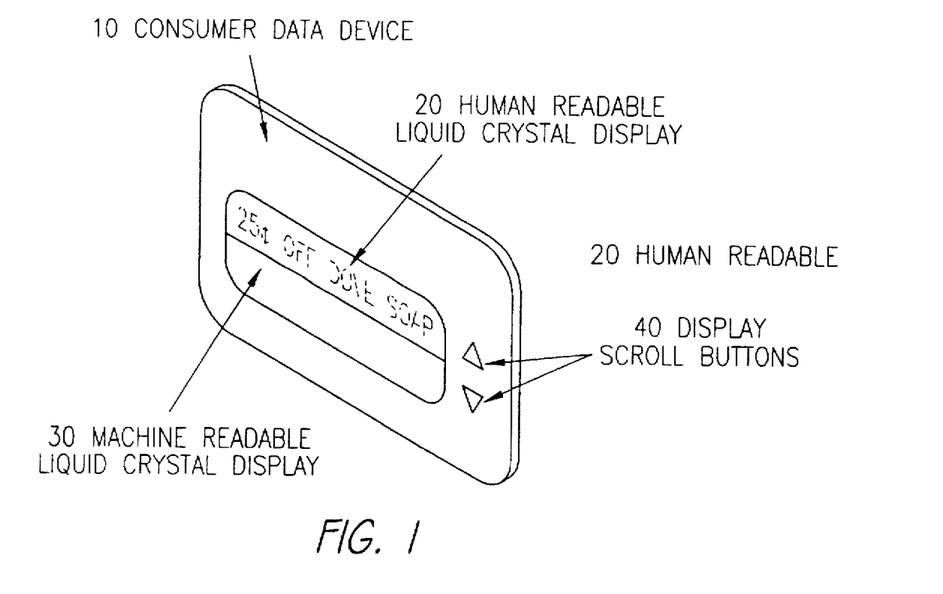
FIG. 1 illustrates a preferred configuration for the Consumer Data Device.

FIG. 1 illustrates a preferred configuration for the Consumer Data Device comprised of a plastic encased, credit-card sized device that contains memory means for data and transaction retention, an LCD display 20 for displaying information, an LCD display 30 for displaying bar-codes to be read by a bar-code scanner, and means to scroll through the stored information for example the up and down scroll buttons 40. The primary means for data communications would be through spread-spectrum RF or direct electrical contact. Methods and apparatus for producing bar codes via an LCD display are disclosed in provisional application Ser. No. 60/000,063 filed Jun. 8, 1995 hereby incorporated by reference.

Figure 2:
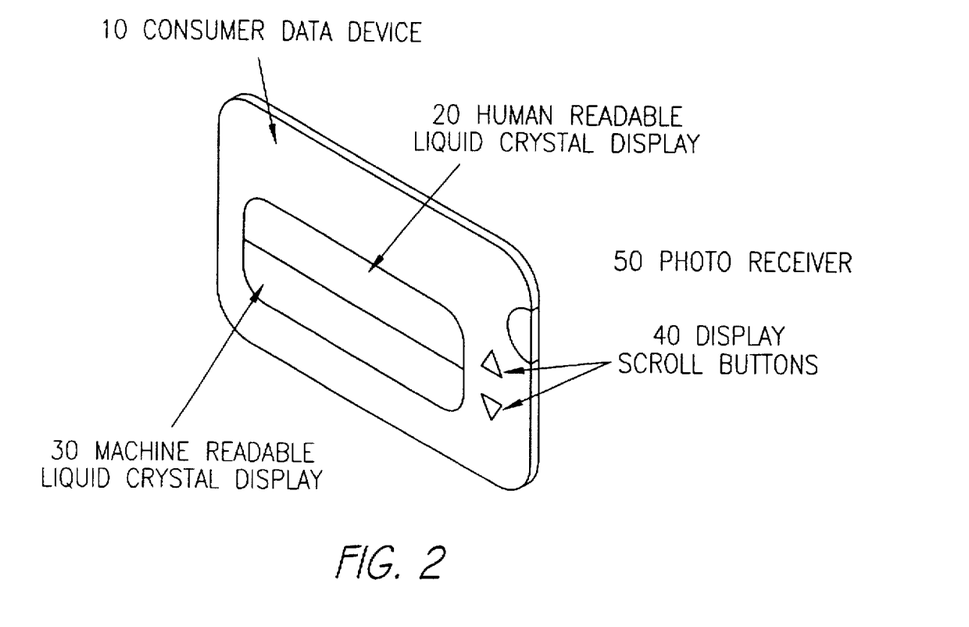
FIG. 2 illustrates an alternative Consumer Data Device.

FIG. 2 illustrates an alternative means for data communications through an optical means which would require a photo-receiver 50 on the CDD. The memory means would have the capability to be segmented into secure and unsecured blocks. The secured blocks would be reserved for encrypted reading and writing of financial information necessary to support electronic purse functions. This information would include incrementing and decrementing currency amounts as well as allocating certain currency amounts for particular stores and/or categories of items. The unsecured blocks would be able to be read and written to by any authorized device, such as POS systems to accomplish coupon generation and redemption. The scroll feature would allow the consumer to view categories and specific stored information within the categories, such as currencies balances in the electronic purses, number and type of coupons and/or rainchecks available, or the like.

Method of Use 1—Use of consumer data device in raincheck generation/distribution system triggered/controlled by real-time inventory management system w/consumer data device storage and redemption capability.

In the retail environment, when a customer discovers a desired item is out of stock, the retailer often desires to provide the customer with a raincheck, which is essentially a certificate granting the customer a guarantee that the out of stock item may be purchased later at the current price. Typically, the certificate may be manually generated by the store clerk.

In a preferred method, the raincheck is automatically generated by an in-store printing device and/or downloaded into a Consumer Data Device after the system has interrogated inventory and determined that the item is not available. By eliminating the manual process that exists today, the store can more efficiently serve the needs of the customer while acquiring information, in real-time, about the movement and inventory status of sale or promotional items. Additionally, the ability to automate the ordering process becomes feasible if this system is connected into the store inventory control system.

Figure 3:
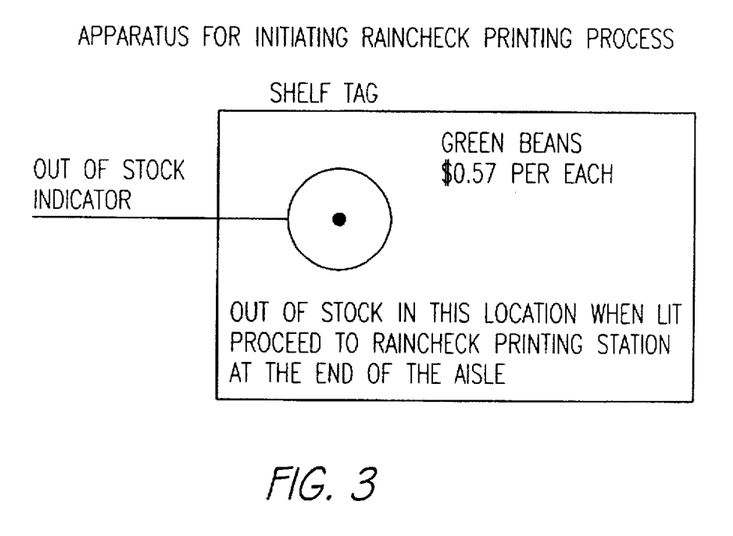
FIG. 3 illustrates an Apparatus for Initiating Raincheck Printing (AIRP)
Figure 4:
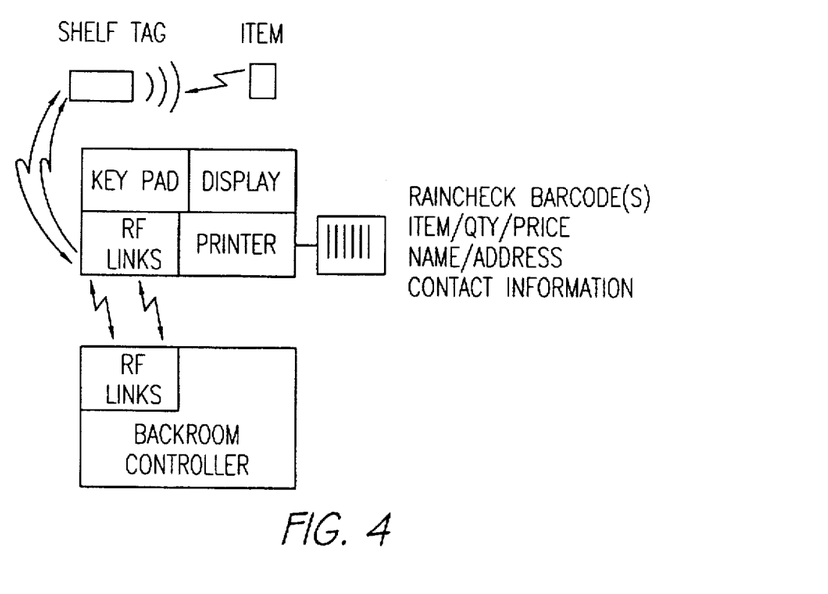
FIG. 4 illustrates a Raincheck Printing System (RPS)

FIG. 3 illustrates an Apparatus for Initiating Raincheck Printing (AIRP). The AIRP would initiate a Raincheck generating session by monitoring the area for the specific RF Tag of the item in question. The AIRP would then determine if there were additional items in the immediate vicinity and initiate communications with the Raincheck Printing System (RPS) (see FIG. 4), if no items were detected. If no items are detected in the area, the AIRP shall indicate this condition to the customer via the Out of Stock Indicator. Customers could ultimately be notified electronically via Internet (e.g. e-mail), fax, or phone when their merchandise arrives at the store, providing the customer input the pertinent information into the Raincheck Printing system at the time of the Raincheck transaction.

Upon detecting the initiation of the Raincheck Printing Process (RPP), the RPS shall interrogate the backroom controller. The backroom controller would then respond to the RPS with one of two kinds of information: Additional Inventory Locations or Item Arrival Date(s). This information will then be presented to the customer via the display on the RPS. If the information is of the Item Arrival Date type, the RPS will ask the customer (via the display) if a Raincheck is required. If a Raincheck is required by the customer, the RPS will interrogate the customer for various pieces of information, i.e., quantity, contact means (fax, phone, e-mail, surface mail, etc.), and print the appropriate information on the form. The form may comprise a bar-code, a set of bar-codes, or other data set or symbol containing the Raincheck information. Alternately, the Raincheck information could be downloaded into the previously described Consumer Data Device, which would allow the consumer to access and redeem the Raincheck once notified electronically by the store.

After the customer interaction has been completed, the RPS will initiate a transmission to the backroom controller with item identification and quantity inventory information for inventory control purposes. If the customer selected a specific means of follow-up contact, that information would also be included. This contact information could be interpreted and utilized by the backroom controller to completely automate a Raincheck system, i.e., automatically send e-mail/fax/phone notification of item availability when inventory indicates item stock availability. Thus the raincheck would be issued only if no merchandise is on the store premises, thus saving store profits downstream. Inventory can be more accurately maintained by ordering enough items to cover normal buying and the additional quantity out on Rainchecks.

The system would allow the customer to save store personnel time by looking at the display of the Raincheck Printing System for additional inventory locations. Moreover, customers would ultimately be more satisfied since they would not have to run around all over the store looking for someone to help them find their merchandise.

Method of Use 2—Use of consumer data device in issuance of coupons from Kiosk system:

Retailers currently utilize one or more of the following methods for distributing coupons:

(1) Free Standing Inserts (FSI's)—Coupons that are made available to consumers through newspapers, magazines and fliers. They are generally not "targeted" by distribution and have quite low redemption rates.

(2) Shelve edge or aisle distributed coupons—Coupons which are typically dispensed by a machine that is located on the shelf edge or near the product in the isle. Flashing LED's and other means of attracting attention are used to get the consumer to remove a coupon from the machine and redeem at the time of purchase.

(3) Point of Sale generated—These point-of-sale generated coupons usually are targeted to the consumer based upon what was purchased during the transaction and thus the consumer must keep possession of them as well as remember to use them.

Figure 5:
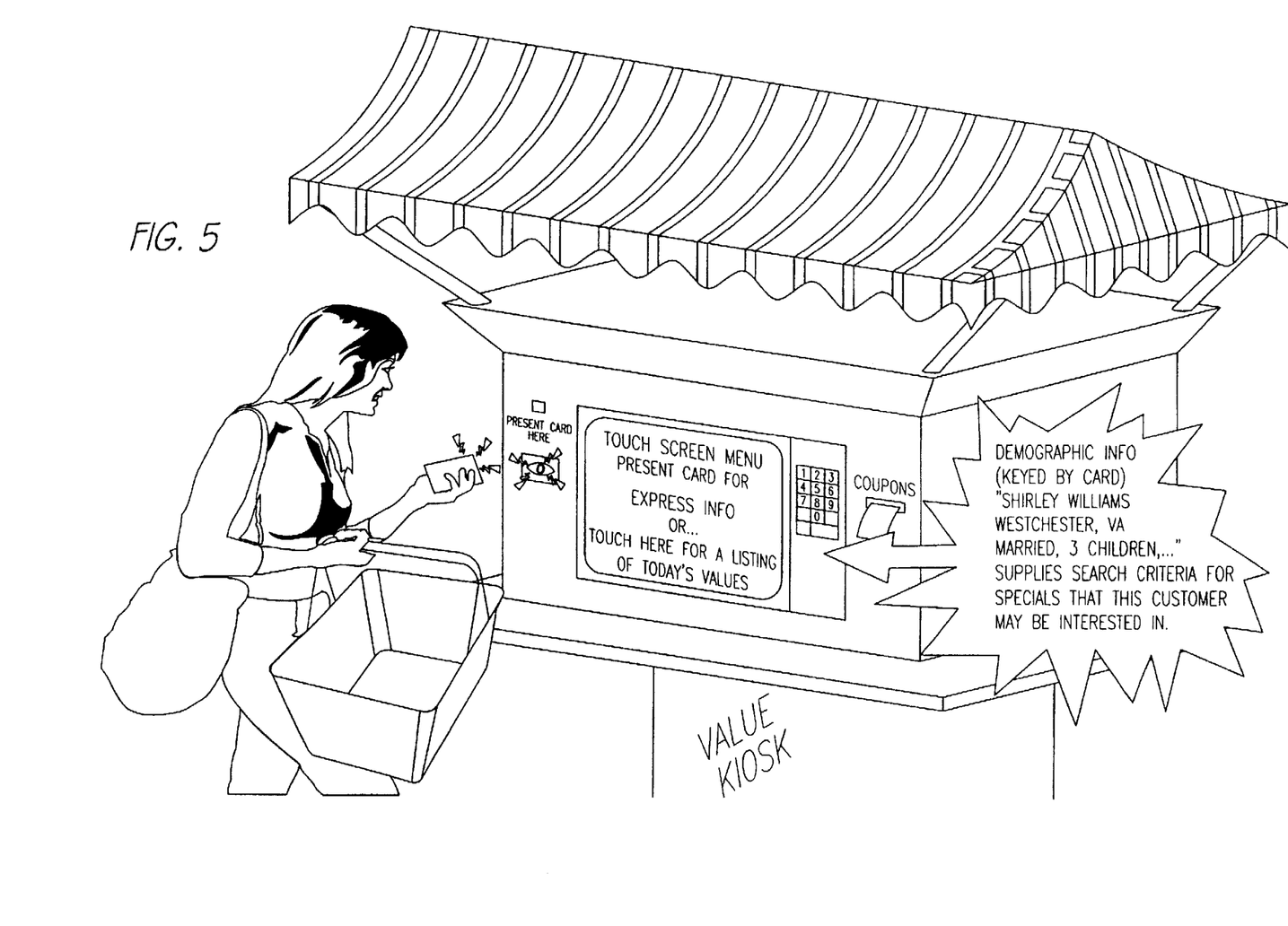
FIG. 5 illustrates a coupon generating kiosk.

FIG. 5 illustrates one embodiment of a coupon generating kiosk having a touchscreen display visible to the consumer, that would allow them to select from coupons and other promotional items as determined by the offerings presented. An alternative means of dispensing the promotional items would be available through a traditional paper generated system via a printing device. This printing option may be necessary if the consumer is not carrying their device or it has limited memory. The kiosk's primary means of communicating to the CDD will be through spread-spectrum RF, but as an alternative it has the ability to communicate to the CDD optically as well as acoustically.

A preferred embodiment for the kiosk coupon generating system would allow a consumer to readily access coupon, discount and promotional opportunities from the kiosk without having to remove and scan or "swipe" their consumer data device. Through the use of Spread-Spectrum RF technology, the kiosk would interrogate the CDD that the consumer is carrying with them.

As the consumer enters the store they would approach the coupon generating kiosk and initiate a "transaction" by selecting the appropriate icon presented on the touchscreen. The kiosk would then interrogate the CDD that the consumer is carrying to determine who is present, as well as accessing information from the CDD's memory. This information could include prior store purchasing history, family specific information such as birthdays, anniversaries, etc., as well as summaries of other transactions that have occurred in the store. Once the purchasing history has been evaluated, the kiosk would present a variety of coupon and promotional discount opportunities to the consumer that could be used in the current shopping visit. Upon selection of these coupons by the consumer, the kiosk would "download" the information to the CDD, once again utilizing RF technology so that the CDD does not have to be physically removed from the consumer's wallet or purse. The redemption of the coupon would occur at the POS, with the POS system or data collection device (combined bar-code scanner/RF reader) interrogating the CDD for stored coupon information. Decrementing and/or deleting of redeemed coupons within the CDD would occur once a match had been made to the appropriately purchased item. Alternative methods of communication between the CDD and the kiosk, as well as the POS system, would be optical and acoustic and through means of a contact pad.

One advantage of this system may be that it allows the manufacturer and store to influence the consumer's buying decision during their current shopping activity and prior to the POS transaction, and it gives the consumer a coupon that they do not have to worry about losing or forgetting as in the case of POS-issued coupons.

A preferred embodiment of the Automated Raincheck System would include some or all of the following. Ideally, rainchecks would be issued only if no merchandise is on the store premises, thus saving store profits downstream. Inventory can be more accurately maintained by ordering enough items to cover normal buying and the additional quantity out on rainchecks.

Methods of Communication

Optical—The use of optical technology to transfer information from the scanning device or the POS/store system would use a modulated infrared source in the preferred embodiment. The modulation would represent the data to be transferred from the POS device to the Consumer Data Device. Alternatively, this link may be accomplished by modulating the scanning laser beam (in the case of the laser scanner), or it could be accomplished by modulating the LED illuminator(s) in the case of wand or handheld CCD type scanners. Alternatively, the scanner could modulate an additional optical source such as a visible indicator or other additional source. The optical source need not be part of the scanner but may be a separate device which is connected to the scanner, the POS terminal, or other data device. The optical signal may be at any wavelength within the part of the electromagnetic spectrum commonly referred to as "optical", which includes from the far-infrared through the deep-ultraviolet.

Optical communication of the CDD to the POS system may be in the form of a bar-code shown on a liquid crystal display (LCD).

RF/Wireless—Another form of the POS terminal to CDD communication channel is in the form of a radio-frequency link (RF link). The function of the RF link would be in a manner similar to that described for the optical method, the main difference being the use of electromagnetic energy in the "RF" spectrum as opposed to the "optical" spectrum for the transfer of the information. In the preferred embodiment, a spread spectrum RF signal would be used. Alternatively, a narrow band RF signal could be used. As in the case of the optical method, the RF device may be a part of the bar-code scanner, or it may be a separate device which may be connected to the scanner, or directly to the POS terminal, or to some other data device. One potentially key advantage to this method may be elimination of the (required) line of sight between the POS system, scanning device and Consumer Data Device.

Figure 6:
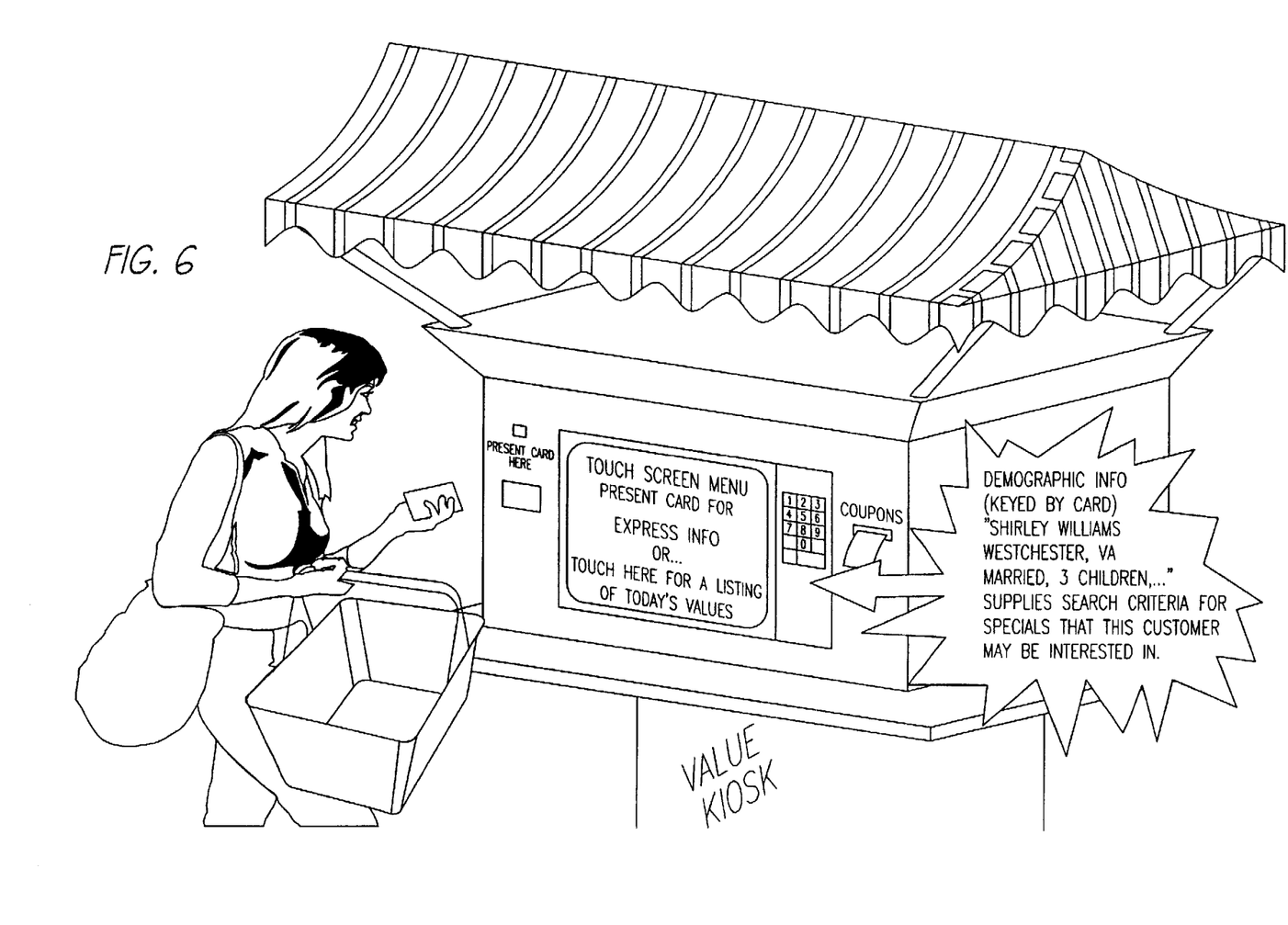
FIG. 6 illustrates an alternate kiosk.

Other—Additional forms of the invention could include one or more of the following for the communication channel: Acoustic link, where the operation and connections would take place acoustically, (longitudinal waves in air); direct electrical connection, where the connections would require contacting the CDD to the POS system, and/or the scanning device (see for example the alternate kiosk of FIG. 6). Inductive or capacitive coupling may be also be used.

What is claimed is:

1. A consumer data device comprising credit-card sized casing containing a memory for data and transaction retention, a first LCD display for displaying information, a second LCD display for displaying bar-codes to be read by a bar-code scanner, means to scroll through stored information, and a data communication link wherein information contained in the bar-codes displayed on the second LCD display correspond to the information displayed on the first LCD display.

2. A consumer data device according to claim 1 wherein the first LCD display displays selected information in human-readable form.

3. A consumer data device according to claim 1 wherein the means to scroll comprises buttons actuatable by the user to allow scrolling through information for displaying on the first LCD display.

4. A consumer data device according to claim 1 wherein the data communication link comprises electrical contacts disposed on the casing.

5. A consumer data device according to claim 1 wherein the data communication link comprises an RF transmission system contained in the casing.

6. A consumer data device according to claim 1 wherein the information comprises discount coupon information.

7. A consumer data device according to claim 1 wherein the information comprises raincheck information.

8. A consumer data device according to claim 1 wherein the information comprises consumer product information.

9. A consumer data device according to claim 1 wherein the data communication link comprises a photo-receiver disposed on the casing.

10. A consumer data transaction module comprising a memory for storing information;
a first display for displaying in human-readable form selected information from the memory;
a second display for displaying in optical scanner readable form the selected information displayed on the first display.

11. A consumer data transaction module according to claim 10 further comprising scroll buttons for allowing the user to scroll through the information stored in memory to display selected information on the first display.

12. A consumer data transaction module according to claim 10 wherein the module comprises a credit-card sized casing.

13. A method for conducting interactive consumer transactions with a store system comprising the steps of:
storing information in a module memory of a hand-held consumer data module;
transferring data from the store system to the data module via a communication link;
displaying in human-readable form selected information on a first display of the data module;
displaying the selected information as an optical code on a second display of the data module.

14. A method according to claim 13 comprising a method of dispensing coupons to consumers comprising the steps of:
generating a display at a kiosk comprised of coupons being offered;
dispensing coupons by permitting the user to select desired coupons, transmitting data of the selected coupons via the transmission link to the consumer data module;
redeeming the selected coupons at checkout by downloading the data of the selected coupons from the consumer data module to the point of sale system.

15. A consumer data device according to claim 1 wherein the first LCD display and the second LCD display are contained within a primary LCD, the first LCD display comprising an upper portion of the primary LCD and the second LCD display comprising a lower portion of the primary LCD.

16. A consumer data transaction module according to claim 10 wherein the first display and the second display are contained within a primary LCD, the first display comprising an upper portion of the primary LCD and the second display comprising a lower portion of the primary LCD.

17. A consumer data transaction module according to claim 10 wherein the second display is readable by a laser scanner.

18. A consumer data transaction module according to claim 10 wherein the display comprises a display face having a first polarizing filter over the first display and a second polarizing filter over the second display.

19. A consumer data transaction module according to claim 10 wherein the second display is not visible to humans in typical unpolarized ambient lighting conditions.

20. A method according to claim 13 further comprising displaying the selected information on the first display in alphanumeric form.

* * * * *

UNITED STATES PATENT AND TRADEMARK OFFICE
CERTIFICATE OF CORRECTION

PATENT NO. : 5,789,732
DATED : August 4, 1998
INVENTOR(S) : McMahon et al.

It is certified that error appears in the above-identified patent and that said Letters Patent is hereby corrected as shown below:

IN THE SPECIFICATION

Figure 7:
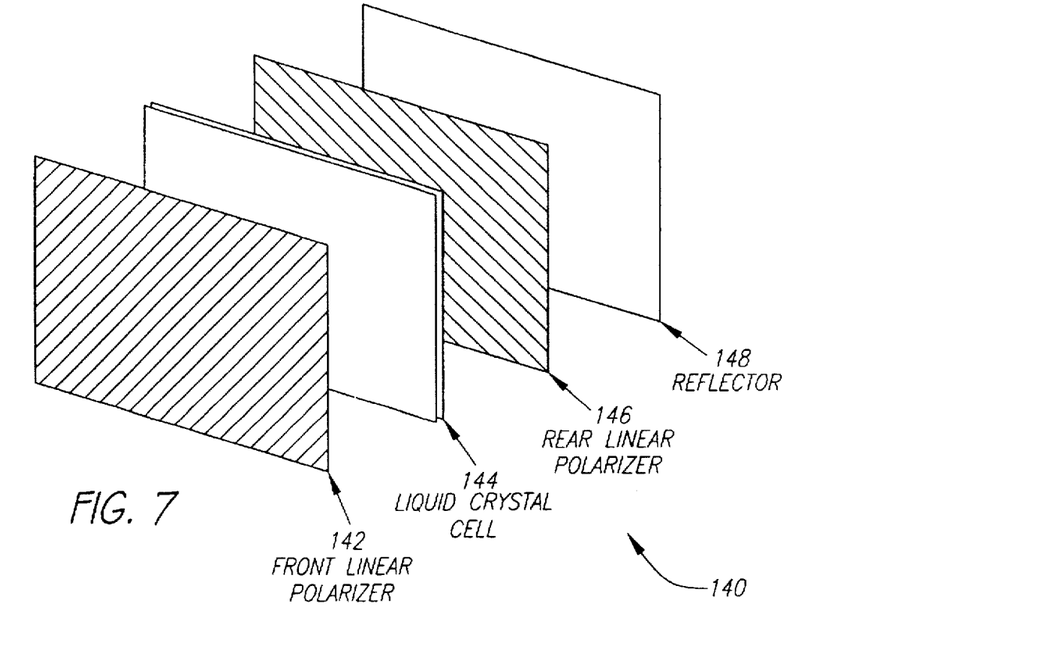
Figure 8:
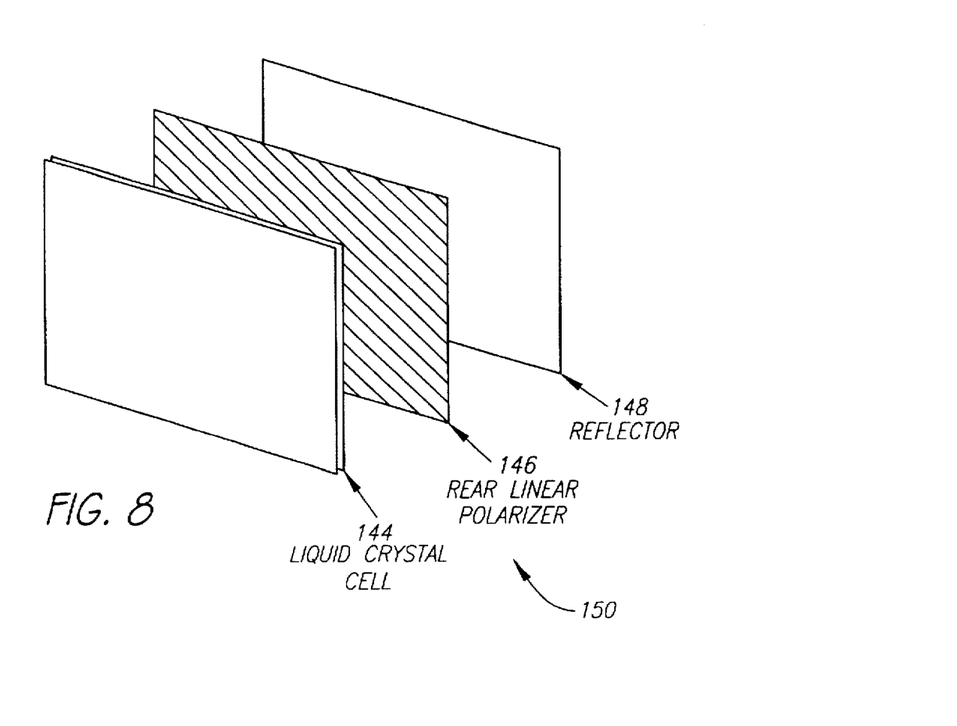
Figure 9:
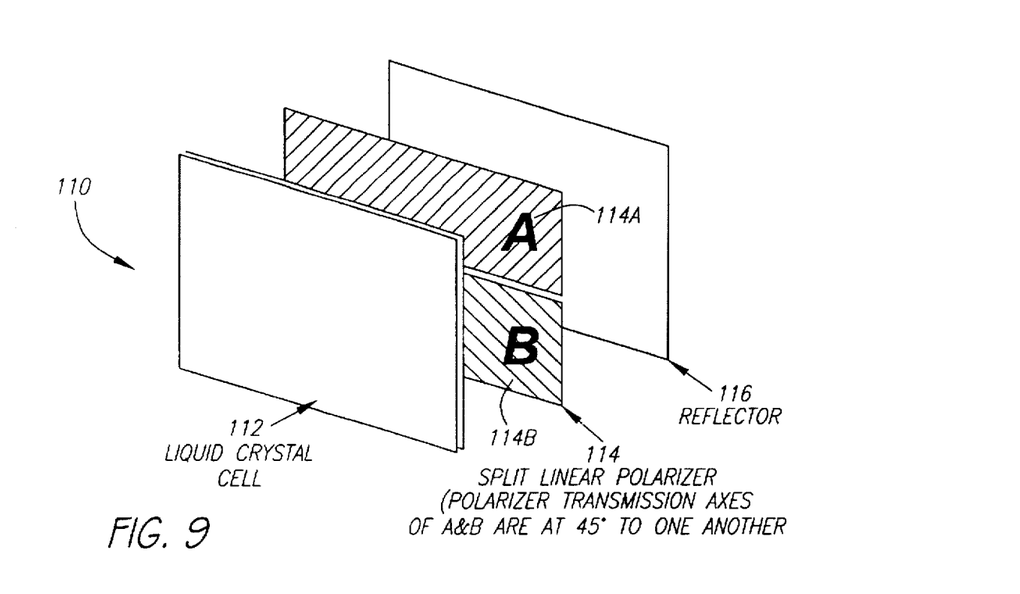
Figure 10:
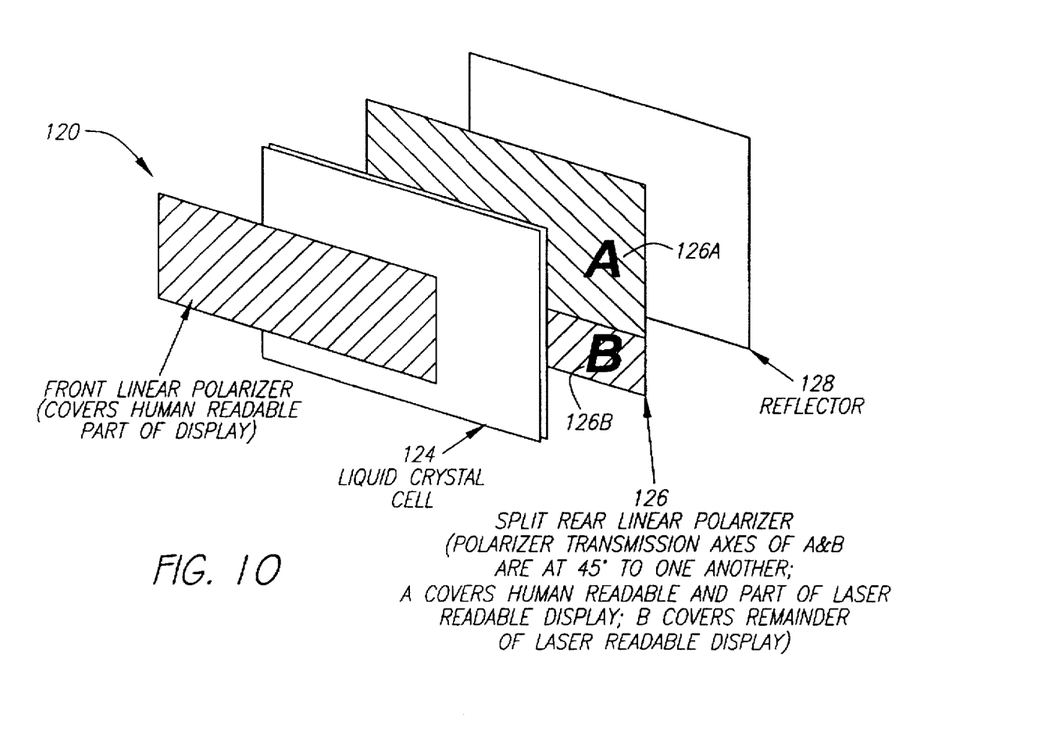
Figure 11:
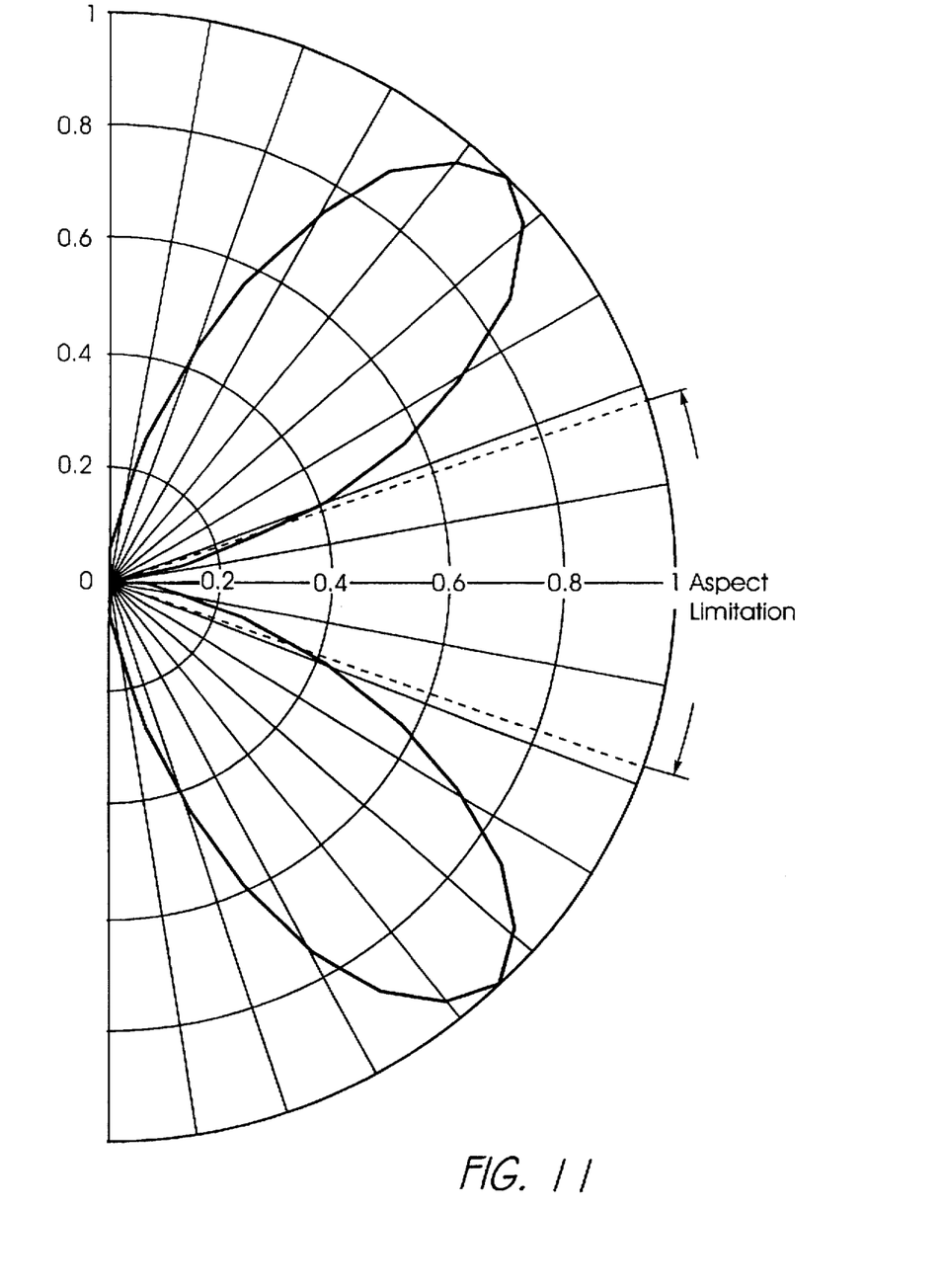
Figure 12:
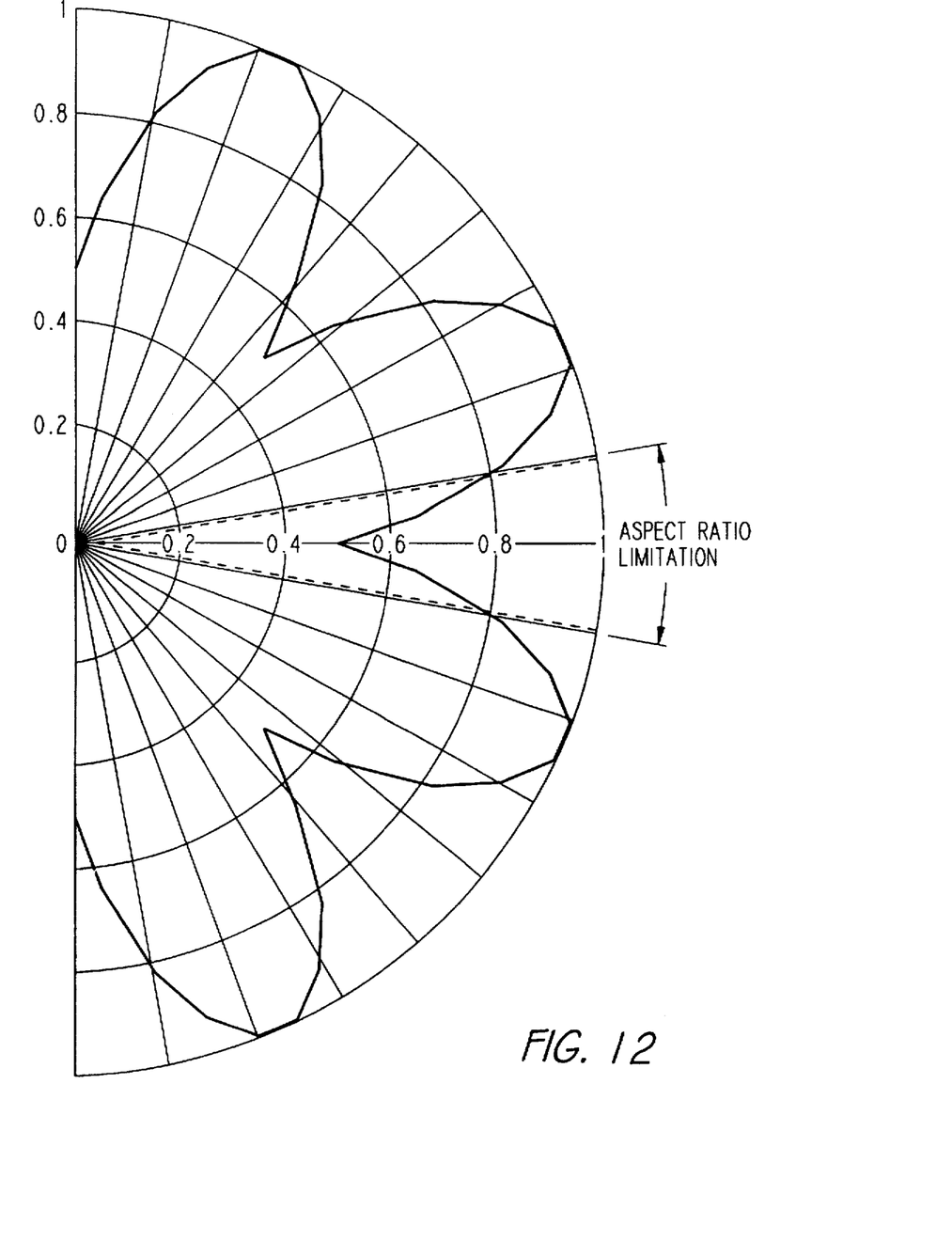

Column 1,
Line 48, after "alternate kiosk" change "." to --;-- and insert thereafter the following paragraphs:

-- Figure 7 illustrates an enhanced contrast laser readable liquid crystal display;
Figure 8 illustrates an enhanced contrast laser/human readable LC display;
Figure 9 illustrates a liquid crystal display stack;
Figure 10 illustrates a laser readable liquid crystal display;
Figure 11 is a graph of worst-case response of a single polarizer LCD display to linearly polarized laser;
Figure 12 is a graph of worst-case response of a dual polarizer LCD display to linearly polarized laser. --

Column 2,
Lines 8-10 delete "disclosed in provisional application Ser. No. 60/000,063 filed June 8, 1995 hereby incorporated by reference" and replace with --described below--.

Column 5,
After line 29, insert the following paragraphs:
-- The preferred embodiment may make use of a configuration 120 as shown in Figure 10. This embodiment allows a section of the display, covered by front linear polarizer 122, to be read by humans, and another section, not covered by item 122, to be read by a laser scanner or other device which uses a substantially polarized light source. Layers of this display, as named form the viewing side to the back side are:

- A linear polarizing filter 122 covering the portion of the display face which is to be human-readable, but not the entire display.
- A liquid crystal cell 124 which is comprised of the liquid crystal containment vessel, alignment layers, liquid crystal materials and electrode structure.

UNITED STATES PATENT AND TRADEMARK OFFICE
CERTIFICATE OF CORRECTION

PATENT NO. : 5,789,732
DATED : August 4, 1998
INVENTOR(S) : McMahon et al.

It is certified that error appears in the above-identified patent and that said Letters Patent is hereby corrected as shown below:

- A second linear polarizing filter 126 which does cover the entire display area, but is split into two sections, 126A and 126B. The first section, marked 'A' in the figure, covers the human-readable part of the display and part of the machine-readable display. This polarizer has its transmission axis either parallel to or at 90° to the first polarizer 122, depending upon whether a 'dark on bright' or 'bright on dark' human-readable display is desired. The section of the polarizer marked 'B' has its transmission at 45° to the transmission axis of section 'A'. This polarizer arrangement, along with special drive phasing to be explained below, allows at least one of the sections of the machine-readable display to have sufficient contrast regardless of the direction of the incoming polarization vector.
- A reflecting layer 128 which is comprised of an optically reflecting material, such as a smooth metallic surface or dielectric microspheres embedded in a binder matrix.

In order to explain the principles involved, a simpler, nonsplit rear polarizer display will first be described. Figure 7 illustrates a conventional reflective display 140 having a front linear polarizer 142, a liquid crystal cell 144, a rear linear polarizer 146, and a reflector 148. In the typical arrangement for this type of display, the front polarizer 142 and rear polarizer 146 are placed with their transmission axes at 90° to one another. As unpolarized light enters through the front filter 142, the light becomes linearly polarized. As the linearly polarized light travels through the liquid crystal layer, the polarization of the light will undergo a 90° twist if the particular area of the liquid crystal is not energized. This light which has undergone the 90° twist will then be aligned with the transmission axis of the rear polarizer 144, which allows the light to pass to the reflector 148. Upon reflection from 148, the light travels the same path in reverse, finally exiting the display and appearing as a 'bright' area. If the liquid crystal 144 is instead energized, then the light will not undergo the 90° twist, and will be absorbed by the rear polarizer 146, causing a 'dark' area on the display.

Figure 8 shows a machine-readable display 150 which is essentially a normal human-readable display 140 (as shown in Figure 7) with the front linear polarizer 142 removed. The liquid crystal cell 144, the rear polarizer 146 and the reflector 48 remain the same as in Figure 7. The front polarizer 142 is unnecessary for use with a light source which is already polarized.For this configuration of display, the information will be unreadable to humans for typical unpolarized ambient lighting conditions. Operation is the same as the display 140 in Figure 7, except that the light is polarized at the source and does not need to travel through a front polarizer.

UNITED STATES PATENT AND TRADEMARK OFFICE
CERTIFICATE OF CORRECTION

PATENT NO.   : 5,789,732
DATED        : August 4, 1998
INVENTOR(S)  : McMahon et al.

It is certified that error appears in the above-identified patent and that said Letters Patent is hereby corrected as shown below:

Figure 11 shows the worst-case contrast for this type of display. Contrast as defined for this graph, is the ratio of reflectance of the light and dark areas of the display. The radial distance from the center of the graph to the plotted curve represents the attainable contrast, and the angle of a line from the center of the graph intersecting the plotted curve with respect to the horizontal is the assumed angle of incoming light polarization with respect to the rear polarizers. This graph assumes that the rear polarizer transmission axis is at 45° to the incident laser beam polarizer. In this case, the information will not be visible to the scanner until the display is rotated in one direction or the other. If the display is rotated clockwise by 45°, for example, then the display will be at maximum contrast. The display will also be at maximum contrast if the display is rotated 45° counterclockwise, as shown by the second lobe in Figure 11. The two lobes of maximum contrast represent the cases where the laser polarization vector is aligned with the rear polarizer when an electric field has been applied to the liquid crystal, and where the polarization vector is aligned with the rear polarizer when no electric field is applied. By reversing the logical sense of which pixels are 'on' and which pixels are 'off' at regular intervals which are long enough for the liquid crystal material to respond, the display will show the correct contrast (bright-on-dark, or dark-on-bright) for at least one of the intervals, thus allowing the display to be used over a 90° range of incoming polarization. In the case of a barcode display with bars parallel to the shorter display dimension, if one assumes that a 'scan line' from a machine barcode reader must cross the entire barcode from end-to-end in one pass, then the angular range over which the barcode will read will be twice the angle made between the long display dimension and a corner-to-corner diagonal line. For a display which is three times as long as it is high, the 'aspect ratio' is 1:3 and the angular acceptance of the barcode display is about 36.9°. This is noted as the 'aspect ratio limitation' on the polar graphs. Thus, for the worst case of a 1:3 aspect ratio barcode with incoming polarization of the scan line at 45° to the rear polarizer, the display may be rotated within the aspect ratio limitation lines to maximize contrast up to 40%.

UNITED STATES PATENT AND TRADEMARK OFFICE
CERTIFICATE OF CORRECTION

PATENT NO. : 5,789,732
DATED : August 4, 1998
INVENTOR(S) : McMahon et al.

It is certified that error appears in the above-identified patent and that said Letters Patent is hereby corrected as shown below:

An improvement may be made upon this basic display of Figure 8 by splitting the rear polarizer in half along the long dimension as shown in Figure 9. For this configuration, the split polarizers 114A and 114B are aligned with their transmission axes at 45° to one another. If the same information to be displayed is repeated on the top and bottom parts of such a display (in the case of barcodes, this is just extending the bars along the entire height of the display), and the alternating drive scheme is employed, then the display angular contrast response will be as shown in Figure 12. The repeating lobes of maximum contrast if Figure 12 occur twice as often due to the split polarizer 114. This means that it is easier to adjust the angle of the display to attain high contrast. It is noted that the aspect ratio limitation angle has been reduced by half, as it is assumed that a 1:3 display has been made into two 0.5:3 displays. In this case one has only half as much rotation over which the bar code may be adjusted in attempting to get a scan line to cross its face, but the display contrast over any rotation now never drops below 50%, and may be adjusted up to 80% within the limits of the aspect ratio limitation. This is a substantial improvement over the previous example.

Alternately, a liquid crystal display may use linear or circular polarization and a 'ramped' or varying drive voltage applied to the display pixels which may vary the acceptance angles of the display to incoming polarized courses used by machine readers. --

Signed and Sealed this

Twenty-eighth Day of August, 2001

*Attest:*

*Attesting Officer*

NICHOLAS P. GODICI
*Acting Director of the United States Patent and Trademark Office*